Aug. 20, 1935.  B. F. WILLIAMS  2,011,601
VALVE
Filed Oct. 31, 1932  4 Sheets-Sheet 1
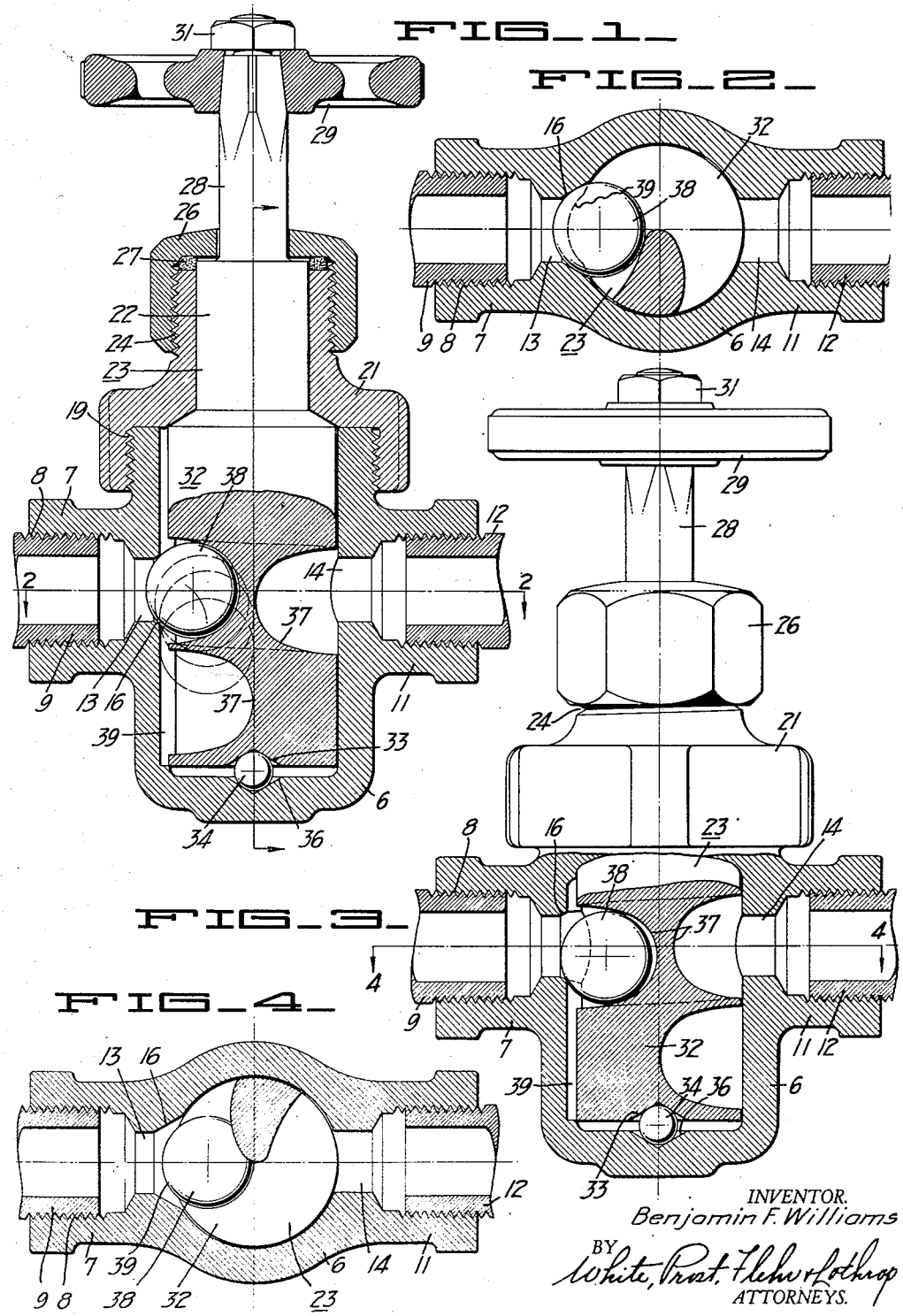
INVENTOR.
Benjamin F. Williams
BY
White, Prost, Flehr & Lothrop
ATTORNEYS.

Aug. 20, 1935.  B. F. WILLIAMS  2,011,601
VALVE
Filed Oct. 31, 1932  4 Sheets-Sheet 2
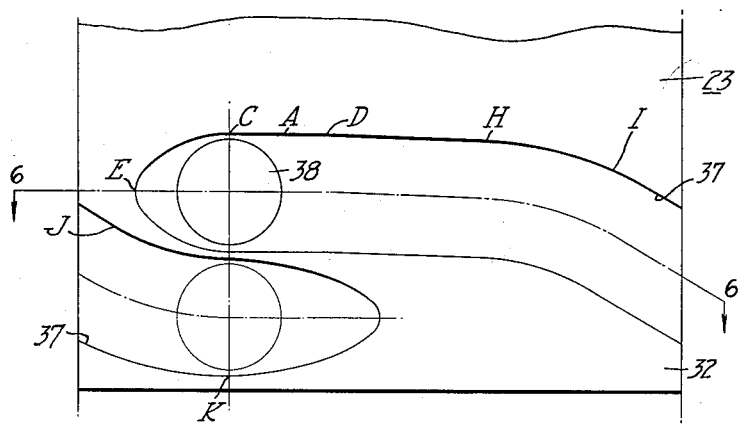
FIG_5_
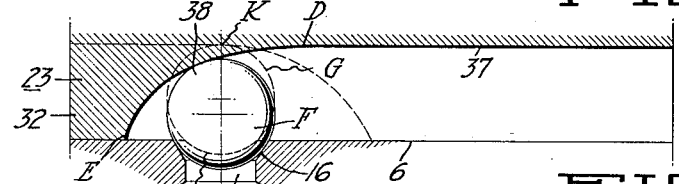
FIG_6_
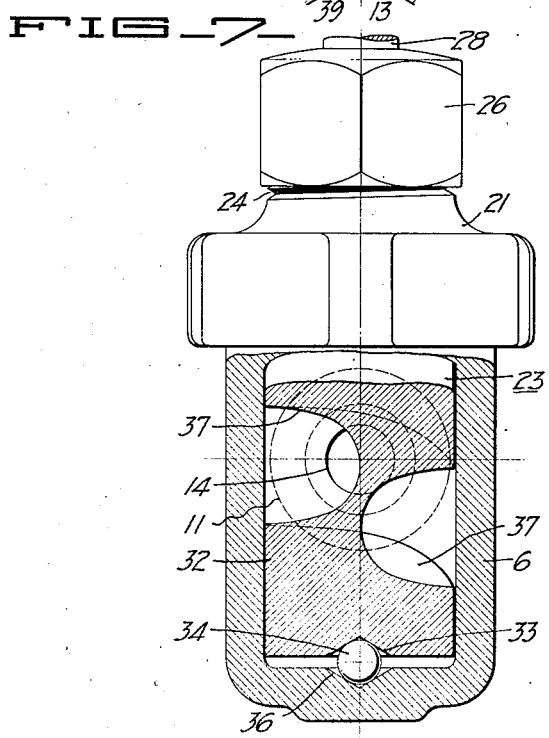
FIG_7_
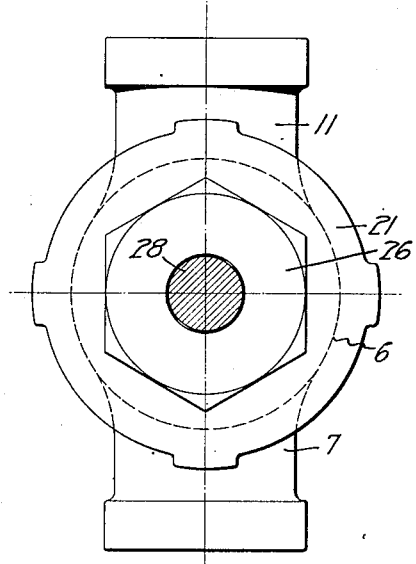
FIG_8_
INVENTOR.
Benjamin F. Williams
BY
White, Prost, Flehr & Lothrop
ATTORNEYS.

Aug. 20, 1935.    B. F. WILLIAMS    2,011,601
VALVE
Filed Oct. 31, 1932    4 Sheets-Sheet 3
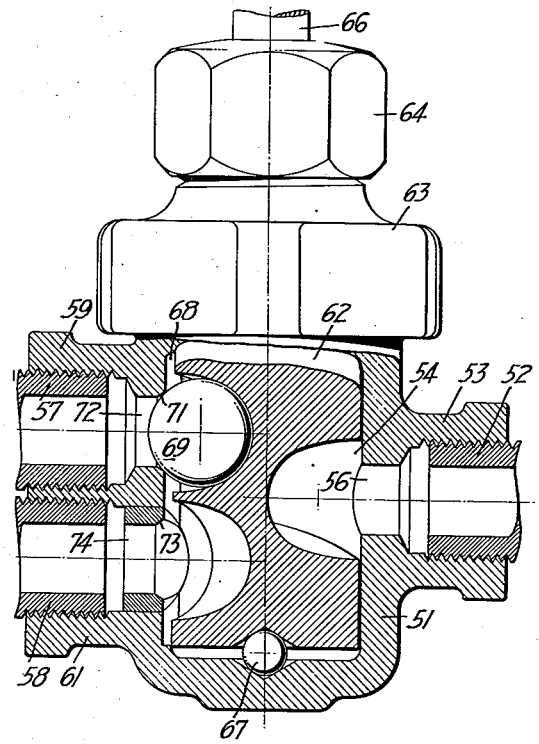
FIG_10_
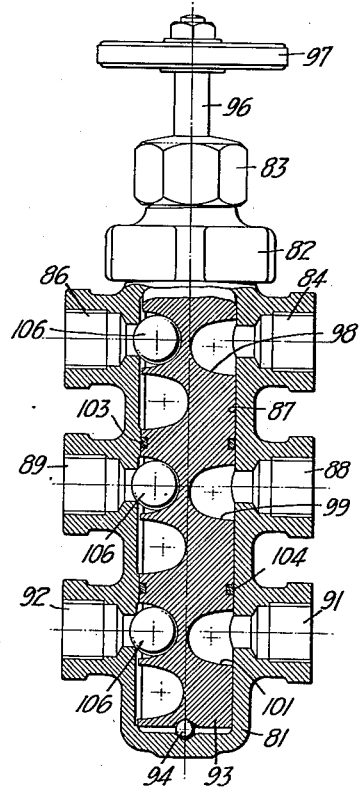
FIG_9_
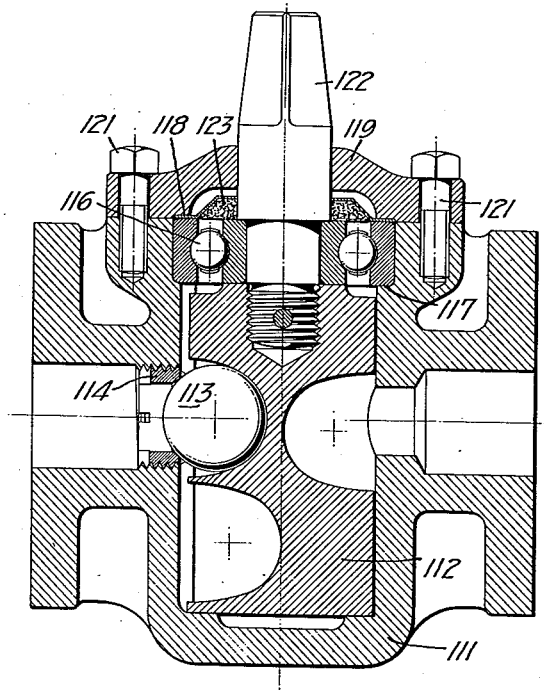
FIG_11_
INVENTOR.
Benjamin F. Williams
BY
White, Prost, Hehr & Lothrop
ATTORNEYS.

Aug. 20, 1935.  B. F. WILLIAMS  2,011,601
VALVE
Filed Oct. 31, 1932  4 Sheets-Sheet 4
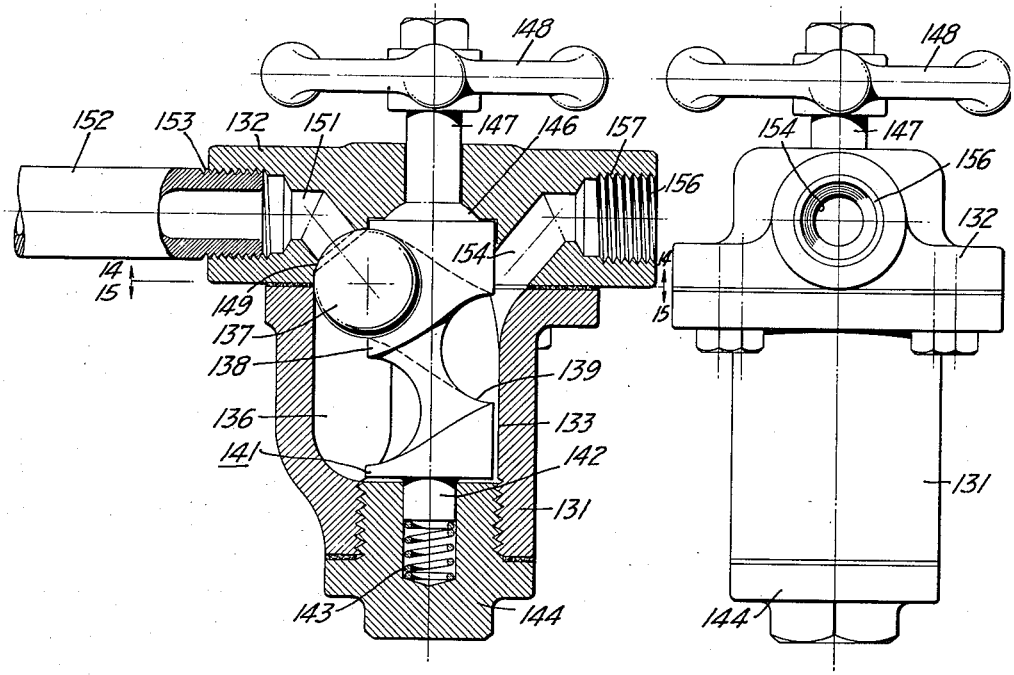
FIG_12_  FIG_13_
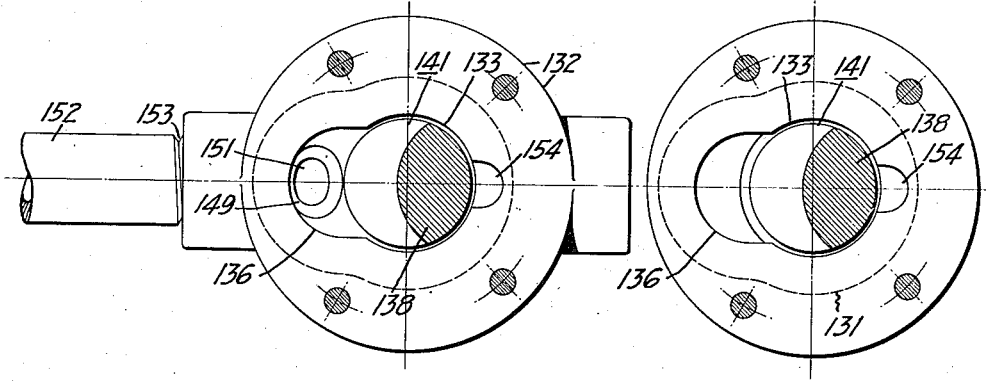
FIG_14_  FIG_15_
INVENTOR.
Benjamin F. Williams
BY
White, Prost, Fisher & Lothrop
ATTORNEYS.

Patented Aug. 20, 1935

2,011,601

UNITED STATES PATENT OFFICE 2,011,601

VALVE

Benjamin F. Williams, San Francisco, Calif., assignor to Wil-Bro Corporation, San Francisco, Calif., a corporation of California Application October 31, 1932, Serial No. 640,467

18 Claims. (Cl. 251—40)

My invention relates to means for controlling the flow of fluid in conduits or other ducts, and is particularly concerned with means for effecting a positive opening and closure of a passage through which fluid is adapted to flow.

An object of my invention is to provide a generally improved valve.

Another object of my invention is to provide a valve in which the closing member can be easily moved despite relatively great differences in pressure on opposite sides thereof.

Another object of my invention is to provide a valve which affords a tight closure not only when the valve is new but also after extended use.

Another object of my invention is to provide a valve which presents little obstruction to flow when in open position.

A further object of my invention is to provide a valve which not only has these special attributes but which is also possessed of the usual attributes of simplicity, cheapness of manufacture and reliability.

The foregoing and other objects are attained in the embodiments of the invention shown in the drawings, in which Figure 1 is a cross section on a longitudinal diametral plane of a valve constructed in accordance with my invention.

Figure 2 is a cross section, the plane of which is indicated by the line 2—2 of Figure 1.

Figure 3 is a view similar to Figure 1, certain portions being in cross section, but showing the rotor of the valve displaced from the position shown in Figure 1.

Figure 4 is a cross section, the plane of which is indicated by the line 4—4 of Figure 3.

Figure 5 is a view showing a development of the surface of the rotor or helix.

Figure 6 is a cross section, the plane of which is indicated by the line 6—6 of Figure 5.

Figure 7 is a cross section on a longitudinal diametral plane of the valve as shown in Figure 1, the plane of section being at right angles to the plane of section of Figure 1.

Figure 8 is a plan of the valve of the preceding figures.

Figure 9 is a cross section on a longitudinal diametral plane of a modified, multiplex valve.

Figure 10 is a cross section on a longitudinal diametral plane of a further modified form of valve in which alternate paths for the fluid are provided.

Figure 11 is a cross section of a further modified form of valve, especially for high pressures.

Figure 12 is a cross section on a diametral plane of an additionally modified form of valve.

Figure 13 is an end elevation of the valve of Figure 12.

Figure 14 is a cross section, the plane of which is indicated by the line 14—14 of Figure 12.

Figure 15 is a cross section similar to Figure 14, the plane of which is indicated by the line 15—15 of Figure 12.

In its preferred form, the valve of my invention comprises a stator, usually in the form of a shell, having an inlet port and an outlet opening for the flow of fluid, within which is arranged a rotor, usually in the form of a helix, adapted to cooperate with and to move from seated to unseated position a closure member, usually in the form of a ball.

In the form of my valve shown in Figures 1 to 8, inclusive, I preferably afford a stator 6, in this instance a shell of cast metal having a boss 7 formed integrally therewith and properly arranged, as by the provision of threads 8, for the reception of a conduit 9, and likewise provided, preferably integrally, with a boss 11 arranged for the reception of a conduit 12. Either the conduit 9 or the conduit 12 can be used as an inlet conduit, with the remaining conduit as the outlet conduit. For convenience herein, a port 13, which establishes communication between the conduit 9 and the interior of the shell 6, is referred to as the inlet port, while a comparable passage 14 is referred to as the outlet port.

Preferably the interior of the shell or stator 6 is of generally circular cylindrical contour, and the bounding surface thereof merges with the bounding surface of the port 13 to provide a seat 16 usually machined to a circular or conical contour. The shell 6 preferably terminates in a thread 19 to afford a convenient means of connection to a cap 21 screwed thereon. The cap acts as a journal for a bearing 22 forming part of the rotor 23 of the valve. The cap 21 in turn is threaded, as at 24, to receive a gland 26 encompassing a suitable packing ring 27 for sealing the bearing 22, which is extended to provide a stem 28 on which a suitable operating mechanism or hand wheel 29 is mounted by means of a fastener 31.

The rotor 23 is also provided at its lower end with an enlarged generally cylindrical portion 32 provided with an indentation 33 bearing against a ball 34 or other suitable anti-friction member resting in a similar depression 36 in the stator or shell 6. The rotor is thus aligned in the shell 6 by means of the ball 34, and also by means of the bearing 22.

The portion 32 is preferably formed into a helix by means of a helical groove 37 which extends therearound, and is of a predetermined contour. Cooperating with the surfaces of the portion 32 of the rotor which define the helix, and likewise co-operating with the seat 16, is a closure member 38 preferably in the form of a ball. In fact, a standard ball usually used as a component of a ball bearing is a satisfactory member for the purposes involved. Rotation of the rotor 23 is effective to cause displacement of the ball from its seat 16, and in order to confine the ball to a predetermined path of movement with respect to the stator 6, I provide the stator with a longitudinal groove 39 arcuate in transverse cross section and extending for substantially the full depth of the stator.

Upon rotation of the hand wheel 29, the rotor is revolved about its longitudinal axis and causes the helix 32 likewise to revolve so that the surfaces of the helix cause displacement of the ball 38 from the seat 16 and cause the ball to be axially translated along the groove 39 from the intermediate portion of the stator or shell 6 to a lower portion thereof. When the ball is in its position away from the seat 16, rotation of the hand wheel 29 in an appropriate direction lifts the ball or causes it to be translated in groove 39 until it again seats in the seat 16. When the ball is in place, flow between the ducts 9 and 12 is precluded, while when the ball is dislodged from its seat flow therebetween is permitted.

In order that the ball 38 may be accurately controlled, and particularly in order that it may be tightly seated when in closed position, I preferably form the helix 32 as indicated by the development shown in Figure 5 and the cross section shown in Figure 6. As particularly indicated in Figure 5, the terminal portion A of the helix, when the ball 38 is in seated position, has little or no lead or pitch or incline with respect to the axis of the rotor, so that rotation of the rotor from point C to point D, for instance when opening the valve, is productive of no axial translation of the ball 38. However, as indicated especially in Figure 6, the radial depth of the helical groove 37 varies from nothing, at point E, to its maximum at point D, so that initial rotation of the rotor toward the valve open position, while not productive of axial translation of the ball, is productive of clearance between the seat 16 and the bottom of the groove 37 into which the ball can move from its seat 16.

In other words, when seated the ball occupies the full line position F in Figure 6, and when unseated partially, occupies the dotted line position G in this figure. From the point D around the rotor to the lower end of the groove; that is, to the point K the radial depth of the helical groove is substantially constant, but the pitch or inclination of the helix varies. Between the points D and H, for instance, the pitch of the helix is very slight, so that in the event the ball 38 is very firmly seated for instance by heavy pressure, and does not of its own accord dislodge from its seat 16, the bounding surface of the helix acts as a wedge or inclined plane to translate the ball along the groove 39, starting it initially with a considerable mechanical advantage due to the slight incline between the points D and H. The effective component of the force thus exerted on the ball by the surface of the helix is not in the direction of the axis of the port 13 but is at a considerable angle or inclination thereto. During this movement of the ball 38, it rolls over one edge of the seat 16, as indicated by the successive positions of the ball shown by dotted circles in Figure 1.

When the ball is completely rolled over the edge of the seat 16, and is properly lodged in the groove 39 and is then relatively easy to move, the pitch of the helix changes, as between the points H and I, until between the points I and J it is quite steep. Between J and K the helix again straightens to substantially no pitch with the ball in its extreme, inoperative position. For the return movement of the ball, the rotation of the rotor causes the helical groove to guide the ball relatively rapidly in an axial direction of translation along the groove 39 until the ball approaches its seated position on the seat 16.

If for any reason the ball does not of its own accord seat, for instance if it must seat against relatively high pressure, then the ball is held in correct axial position by the portions of the helix between the points D and C, while at the same time the decrease in radial depth of the helix between the points D and E, for instance, forces the ball against its seat 16 despite such adverse heavy pressure. Because of the relatively gradual change in direction of the surface defined by the curve between the points D and E, a considerable mechanical advantage is had, so that a relatively light pressure on the operating handle 29 is effective to seat the ball on its seat 16 against quite heavy pressure.

Because of this construction, not only is the ball positively seated and unseated with considerable available force, but since it is rolled from its operative to its inoperative position, and vice versa, it is not seated in exactly the same position twice in succession, so that wear is distributed uniformly over substantially all parts of the ball.

The contour of the helix as indicated is productive of another advantage, particularly illustrated in Figures 3 and 7; namely, that when the ball is in its inoperative position, that is, when the valve is open, the free area available for flow through the valve between the conduits 9 and 12 is substantially unobstructed. As a matter of fact, and depending upon the design, the free area through the valve, contrary to usual practice, is often more than the area of the conduits themselves. As an additional advantage of this type of helix, when the valve ball 38 is freed from its seat but is not actually displaced therefrom, in the event that a relatively higher pressure exists in the conduit 12 than in the conduit 9, or in the event that flow is in the direction of the conduit 9 from the conduit 12, the ball 38 can act as a check valve. This is because it is free to move radially of the rotor and of the stator in the clearance space between the seat 16 and the helical groove when the maximum depth thereof, say at the point D, is adjacent the ball. The assembly of the parts of the valve is particularly easy, it being merely necessary to place the ball 38 in the lowermost portion of the helical groove, say adjacent the point K, and insert the ball and the rotor together into the stator with the ball being guided by the groove 39 until the stator is in inserted position, at which time the cap 21 can be screwed home to complete the assembly.

In Figure 10 is illustrated a modified form of valve in which there is provided a stator or shell 51 having not only a conduit 52 joined thereto at a suitable boss 53 and communicating with the interior 54 of the shell through a port 56, but also provided with a pair of conduits 57 and 58, respectively, which are joined to the shell or stator 51 in bosses 59 and 61, respectively. The stator is provided with a rotor 62 similar to the rotor disclosed in Figure 1, and is likewise closed by a cap 63 and a gland 64 as in the previously described modification. An actuating stem 66 is connected to the rotor and serves to revolve it on an anti-friction bearing 67 suitably centered in the stator 51.

Designed to be translated in a longitudinal groove 68 in the stator is a ball 69 which is adapted to rest, as at 71, on a suitable seat at the juncture of a duct 72 establishing communication between the conduit 57 and the interior 54 of the shell 51. The ball 69 is translated from its position in the seat 71 along the groove 68 as previously described until it arrives in its lowermost or opposite extreme position whereat it is caused to be seated in a seat 73 at the juncture of a duct 74 establishing communication between the conduit 58 and the interior 54. The ball 69 is thus effective to block communication through the duct 57 or to block communication through the duct 58, depending on which extreme position the stem 66 and the helix 62 occupy.

A multiplex valve is disclosed in Figure 9. This comprises a shell or stator 81 crowned with a cap 82 and a gland 83 and provided with a plurality of pairs of ducts. The uppermost pair of ducts 84 and 86, respectively, communicate with the interior 87 of the shell 81. Also communicating with the interior 87 of the stator is a similar pair of ducts 88 and 89 respectively, while still another pair of ducts 91 and 92 also is in communication with the interior 87. The stator 81 serves as an enclosure for a rotor 93 at its lower end mounted on an anti-friction bearing 94 in the shell 81 and at its upper end extending as a stem 96 provided with an operating wheel 97.

Intermediate its extremities the rotor 93 is provided with a plurality of separate helices 98, 99 and 101, respectively, to serve the individual pairs of ducts. Preferably the helices are isolated from each other and communication longitudinally through the shell 81 is prevented by packing or sealing rings such as 103 and 104 encompassing the body of the rotor 93. Each of the helices is provided with a ball 106 in order that the associated seats of the adjacent ducts may be closed or opened, depending upon the relative location of the rotor and the stator. In the form disclosed, all of the balls are moved simultaneously, but polar displacement of the individual helices 98, 99 and 101, respectively, can be resorted to in order to vary the phase relationship of the opening of the various ducts.

In Figure 11 there is illustrated a valve similar to that shown in Figure 1, but designed primarily for high pressure service. In this particular instance, the stator is a very heavy shell, preferably a forging such as 111, containing a suitable rotor 112 and a ball 113. The shell 111 has screwed thereinto a separate seat 114 for the ball 113 to abut when in seated position. Preferably the central bore of the shell is counterbored to receive the outer race of an anti-friction bearing 116 which is clamped in place between a shoulder 117 in the shell, and a comparable annular shoulder 118 on a cap 119 secured as by studs 121 to the shell 111. The rotor 112 is provided preferably with a separate stem 122 which serves, in conjunction with the rotor, to confine the inner race of the anti-friction bearing 116 and thus locate the rotor with respect to the stator in so far as axial position is concerned. A suitable packing device 123 is preferably clamped in place between the cap 119 and the bearing in order to preclude leakage along the stem 122.

In Figures 12 to 15, inclusive, there is illustrated a form of valve in which the seating member or ball is not required to roll over the surface of the seat during seating and unseating movement. In this modification of the invention, there is provided a shell or stator 131 which is formed separately from a cap 132. However, the cap 132 and the remaining portion of the stator can be formed integrally if desired. The stator 131 is provided with a generally circular cylindrical bore 133 into which merges a groove 136 extending axially of the stator and designed to receive a seating member or ball 137. The ball is translated longitudinally of the stator 131 or axially thereof by means of a helix 138 defined by a helical groove 139 in a rotor 141.

The lower end of the rotor is provided with a cylindrical boss 142 abutting a spring 143 which is received in a recess in a plug 144 screwed into the stator 131. The rotor at its upper end is preferably provided with a spherical sealing surface 146 abutting in fluid tight relationship a comparable spherical sealing surface in the cap 132, against which the surface 146 is urged by the action of the spring 143 in order to preclude leakage of fluid from the interior of the stator along a stem 147 which is joined to the rotor. A suitable operating handle 148 is mounted on the stem.

In its seated position the ball 137 abuts a seat 149 at the juncture of the interior of the stator and a duct 151 which leads to a conduit 152 suitably fastened in the cap 132, for instance, by screw threads 153. A comparable duct 154 also communicates with the interior of the stator and leads to an opening 156 provided with screw threads 157 for the reception of a conduit (not shown). Due to the inclination of the axis of the seat 149 with respect to the axis of translation of the ball 137, the ball abuts the seat 149 without being required to roll thereover as in the modification disclosed in Figure 1. Nevertheless, the ball is moved positively to seating position and is removed positively therefrom due to the action of the helical surfaces of the helix 138. Inasmuch as the line of thrust of the helix against the ball 137 for seating purposes is such as to have a component opposing the force of expansion of the spring 143, the ball can be urged against its seat with a predetermined amount of resilience. In the event that such resilient urgency is not required, the clearance between the bottom of the rotor 141 and the plug 144 can be eliminated so that there is a direct thrust bearing therebetween.

What is claimed is:

1. A valve comprising a stator having a circular bore and a groove merging therewith, said stator also having a port therein, a rotor rotatable in said bore, said rotor having a helical groove therein, and a ball contained in both of said grooves and movable therein in response to relative rotation between said stator and said rotor to be seated in and unseated from said port.

2. A valve comprising a stator having a port therein and a guideway merging with said port, a rotor having a guideway therein arranged at an inclination to said first-named guideway, and a closure for said port disposed in both of said guideways and adapted to move therein toward and away from said port upon relative movement of said stator and said rotor.

3. A valve comprising a body having a port therein and a guideway merging with said port, a member movable relative to said body, said member having therein a guideway successive portions of which overlie successive portions of said first-named guideway upon relative movement of said body and said member, and a closure movable in said guideways for said port adapted to occupy the overlying portions of said guideways.

4. A valve comprising a stator having a circular bore and a groove merging therewith, there being a port in said stator adjacent said groove, a ball movable in said groove and adapted in one position to block said port, and means including a rotor in said bore for moving said ball in said groove.

5. A valve comprising a stator having a port and a groove merging therewith, a ball movable in said groove and adapted in one position to block said port, a rotor, and a helix on said rotor for moving said ball in said groove.

6. A valve comprising a stator having a port and a groove merging therewith, a ball movable in said groove between two extreme positions in one of which said port is blocked, a rotor, and a helix on said rotor and contacting said ball to move said ball between said positions.

7. A valve comprising a stator having a port, a ball movable into a position blocking said port, and a rotor having a helical groove partially encompassing said ball for moving said ball upon relative rotation between said stator and said rotor.

8. A valve comprising a stator having a cylindrical bore and a port merging with said bore, a rotor disposed in said bore and having a helical groove therein, and a ball disposed in said groove and adapted to be moved into and out of said port by relative rotation of said rotor and stator.

9. A valve comprising a stator having a bore and a port merging with said bore, a rotor adapted to rotate in said bore about a central longitudinal axis, said rotor having a helical groove therein, and a ball disposed in said groove on one side of said axis and adapted to be moved into and out of said port by relative rotation of said rotor and stator.

10. A valve comprising a stator having a bore and a port merging with said bore and having an axis extending in a predetermined direction, a ball adapted to seat in said port, and a rotor disposed in said bore for actuating the ball and having a surface adapted to exert an unseating force on said ball at an angle to said axis upon initial relative movement of said stator and rotor.

11. A valve comprising a stator having a bore and a port merging with said bore and having an axis extending in a predetermined direction, a ball adapted in one position to be seated in said port and in a second position to be unseated, and a rotor having surfaces adapted on initial movement of the rotor to exert force on said ball at an angle to said axis and afterwards to move said ball between said positions upon relative movement of said rotor and said stator.

12. A valve comprising a stator having a circular bore and a port merging with said bore, a ball adapted to be moved to seated position in said port and to unseated position, a rotor disposed in said bore and having a helical groove engaging said ball to move said ball between said positions upon relative movement of said rotor and stator, and means for constraining axial movement of said rotor in said stator.

13. A valve comprising a stator having a circular bore and a port merging with said bore, a closure adapted to be moved axially of said bore between a seated position in said port and an unseated position, a helix engaging said closure and rotatable in said bore for moving said closure, and means for constraining said rotatable helix against axial movement in said bore.

14. A valve comprising a stator having a circular cylindrical bore and a port merging with said bore at one side thereof, a ball located eccentrically in said bore and constrained to move axially of said bore between a seated position in said port and an unseated position, a helical rotor engaging said ball for moving the same and disposed concentrically in said bore, and means for constraining said rotor to rotation in said bore.

15. A valve comprising a stator having a circular cylindrical bore and a port merging with said bore at one side thereof, said stator also having a groove therein extending from said port to a point away from said port, a ball adapted to move in said groove, and a helical rotor in said bore and engaging said ball and effective to move said ball upon relative rotation between said rotor and said stator.

16. A valve comprising a stator having a port therein, a ball adapted to seat on the part of the stator surrounding said port, and means for dislodging said ball from said port including a helix engaging said ball.

17. A valve comprising a stator having a port therein, a ball adapted to seat on the part of the stator surrounding said port, means including a helix engaging said ball for dislodging said ball from said seat, and means for guiding said ball when dislodged.

18. A valve comprising a stator having a port therein, means for blocking said port, and means including a helix engaging said blocking means for dislodging said blocking means from said port.

BENJAMIN F. WILLIAMS.